April 2, 1940.　　　　　J. ENGEL　　　　　2,196,063
X-RAY EXPOSURE APPARATUS
Filed May 20, 1939　　　2 Sheets-Sheet 2
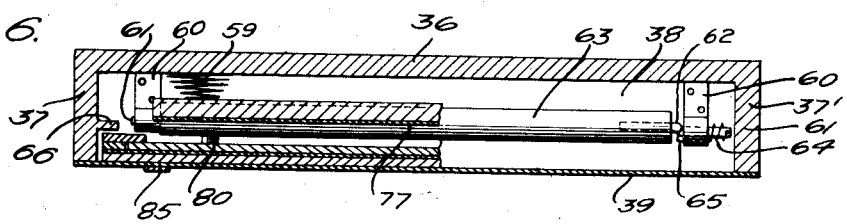
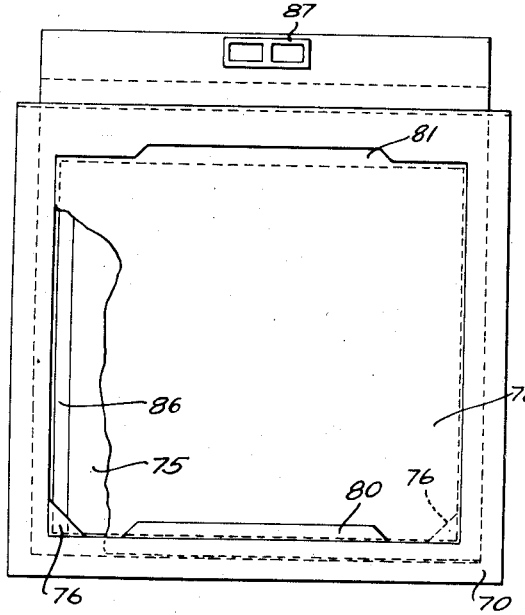
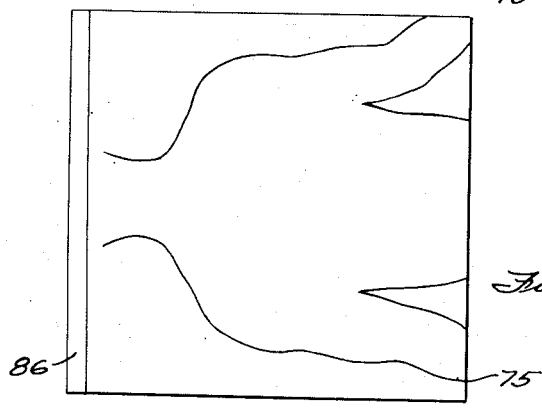
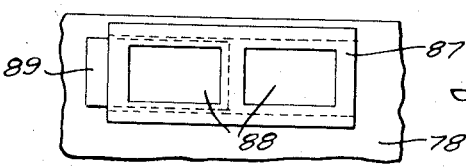
INVENTOR
JOSEPH ENGEL
BY Warren E. Willis
ATTORNEY Patented Apr. 2, 1940

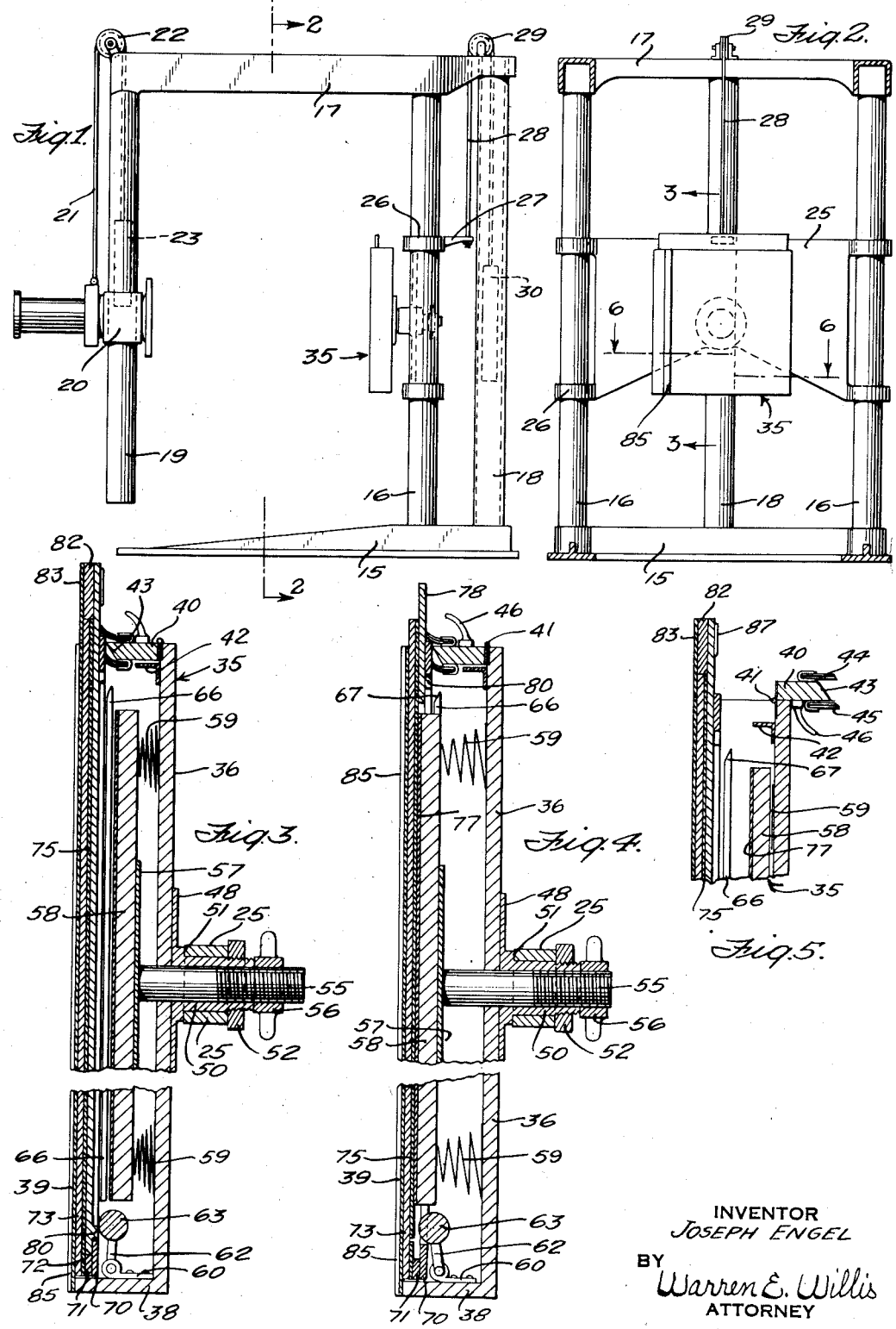

2,196,063

UNITED STATES PATENT OFFICE 2,196,063

X-RAY EXPOSURE APPARATUS

Joseph Engel, New York, N. Y.

Application May 20, 1939, Serial No. 274,755

9 Claims. (Cl. 250—66)

This invention relates to apparatus used in producing images of interior parts of the human anatomy upon sensitized films when subjected to certain invisible light, known as Roentgen or X-rays, by which such radiographs or skiagraphs are obtained.

As this description is addressed particularly to persons skilled in the art, it is not regarded as necessary to point out the advantages of such pictures, which portray the inner organs and their conditions, as precisely as a photograph shows the exterior. Every physician, surgeon, dentist and others whose profession has to do with living anatomical subjects is familiar with the foregoing.

It is well known that the activity of such rays is comparable with the velocity of visible light, hence it is essential that the film be highly sensitive when taking live objects in order to prevent blurring of the picture by possible, even slight movement of the subject; this is particularly important in making radiographs of fluctuating organisms, such as the heart.

Time is also an important factor in operating such apparatus, for while the film exposure takes but a fraction of a second, the preliminaries, including manipulation of the apparatus, arrangement of the subject and positioning the firm, consume far more time, slowing the operation unnecessarily.

It is therefore an object of this invention to provide an apparatus arranged for easy and instant adjustment to suit the attendant circumstances, and in which a holder containing a single flat film composed entirely of cardboard, may be entered and removed without waste of time, the films being individually developed.

A further feature is in the provision of a film holder housing movable into any desired position and freely receptive of a holder containing a flat film without exposure to light, in an unusually rapid manner.

Another purpose is to produce means for guiding the holder within the housing and to press it into proper contact with the face of the housing.

A further aim is to increase the speed of a normal film by an intensifying screen.

These and other advantageous objects, which will hereafter become apparent, are accomplished by the novel and practical construction, combination and arrangement of parts hereinafter described and illustrated in the accompanying drawings, constituting a material component of this disclosure and in which—

Figure 1 is a side elevational view of an embodiment of the invention as arranged for operation.

Figure 2 is a vertical sectional view taken on line 2—2 of Figure 1.

Figure 3 is an enlarged sectional view of the housing, showing the film holder in position, but released from pressure, the section taken on line 3—3 of Figure 2.

Figure 4 is a similar view of the same but showing the film holder clamped against the face of its housing and its cover raised ready for exposure.

Figure 5 is a fragmentary sectional view of the same parts, but showing the housing open at one end and the clamp further retracted.

Figure 6 is an enlarged transverse sectional view taken on line 6—6 of Figure 2.

Figure 7 is a front elevational view of the film holder parts broken away to show the structure.

Figure 8 is a perspective view showing the firm holder in detail, its cover raised.

Figure 9 is a diagrammatic view of an exposed flat film.

Figure 10 is an enlarged fragmentary plan view, indicating a preferred form of identification means for the films.

By reference to the drawings, Figures 1 and 2 will be seen to show the main features of the apparatus stand, consisting of a base 15 in which are fixed a pair of standards 16, united in spaced parallel relation by a connecting frame 17 at their upper ends.

A tubular column 18 extends between the base and frame, spaced rearwardly of the standards and centrally of the structure.

Supported rigidly by the frame, at a point directly in front of the column, is a pendant hollow arm 19 on which is slidably mounted an X-ray tube 20, its weight counter-balanced by a flexible connection 21, passing over a sheave pulley 22 and attached to a counter-weight 23 movable within the arm 19.

A carrier plate 25 is provided with opposed pairs of spaced bosses 26 bored to slidably engage on the standards 16. It also has at its top a central rear projection 27 to engage a flexible connection 28, trained over a pulley 29 and secured to a counter-weight 30 movable in the upright 18.

From the foregoing, it will be apparent that the X-ray tube 20 and carrier plate 25 are each independently manually adjustable for height within the apparatus.

The film holder housing, generally designated by the numeral 35, is preferably an elongated rectangle in profile, consisting of a box-like casing having a back plate 36, sides 37 and 37', bottoms 38 and a thin X-ray transparent front 39, such as aluminum or fibre.

At the top is a cover 40, held by a hinge 41 to the back 36, which is provided with an inreaching angular bracket 42 extending the entire width of the housing to avoid light penetration.

The cover is narrower than the full depth of the housing and its front edge 43 is bevelled as shown. Carried by the cover are keepers in which are secured the inner edges of flexible strips 44—45 of felt, rubber or the like adapted to contact parts of the film holder when entering the housing. A handle 46 on the cover provides a convenient means for its operation.

Rigidly fixed on the outer surface of the back plate 36, substantially at its center, is a flange 48 from which extends rearwardly at a right angle a hollow sleeve 50, having a shoulder 51 and threaded at its outer end to receive a nut 52.

The sleeve 50 is fitted to rotate in an opening approximately in the center of carrier plate 25 and can be clamped in adjustment by the nut 52, thereby permitting the housing to be turned to suit requirements and thereafter secured.

Slidable in the sleeve 50 is a stud 55, its threaded outer end engaging a hand nut 56 the inner face of which contacts the end of the sleeve.

The opposite, inner end of the stud 55 is fixed in a thin plate 57 secured to the rear surface of a pressure plate 58 of greater area, movable in the holder, between its side walls and pressed towards the front by a plurality of spiral springs 59, here shown near its corners, the base of the springs seated against the back 36 of the holder.

A pair of spaced brackets 60 are secured to the inner surface of the housing bottom 38, these brackets carrying pintles 61 having raised offset ends 62 on which is mounted the ends of a roll 63, normally pressed toward the front of the holder by a torsion spring 64, but limited by a stop pin 65, the purpose of the roll later becoming apparent.

Set in the inner surface of the housing side 37 is a raised guide strip 66, extending nearly from top to bottom and bevelled at its upper end, as at 67, to act as a guide for the plate holder.

The flat film holder or cassette, shown best in Figures 7 and 8, consists of an open front rectangular frame 70, a spaced frame 71 of greater interior dimensions and open at the top, a thinner frame 72, equivalent in area to the front frame and a backing plate 73, all of which are rigidly secured together as a unit.

A film 75, flat and unwrinkled, is entered in between the sides of the open topped thin frame 72, its lower corners being guided by raised corner sockets 76 struck from the frame 72; the emulsion side of the film is disposed rearwardly, closely adjacent an intensifying screen 77 on the front face of the backing plate 58.

A shutter 78 is entrable the film holder through the open topped spacer frame 71 between the frame elements 70 and 72. A stop 80 is secured on the lower marginal portion of the shutter 78, the stop entering a recess 81 in the top member of the outer frame 70, level therewith.

At the upper, rear surface of the shutter 78 is a spacer 82 over which is secured an overhanging shield 83, adapted, when the cover is fully entered into the holder, to engage over the upper edge of the frame plate 73 thus shutting off possible infiltration of light.

At least one of the margins of the film may enter under a strip of lead 85, fixed in the film holder housing, whereby a blank space 86 for inscription is provided; the shutter 78 may also be provided with a raised guide strip 87 having front apertures 88 into which identification labels 89, such as celluloid, may be inserted.

In operation it is preferable to have ready a large number of holders loaded with film so that no delay may be incurred by repeated requisitions on the dark room.

The X-ray tube 20 and holder head 35 having been adjusted to suit the circumstances, the film holder housing cover 40 is raised, the backing plate 58 retracted, by twirling the nut 56, and a filled holder entered, its cover being pressed by the roll 63 by which it is guided into its groove.

The film holder housing cover 40 is then closed, the holder cover withdrawn to its stop position, the intensifying screen 77 on the front face of the backing plate 58 is impressed against the film, and film exposed after proper setting of the X-ray tube and positioning of the subject.

After exposure the backing plate 58, is retracted, the film holder cover re-inserted, the cover 40 is raised, and the holder withdrawn.

Eventually, the flat films are indexed in accordance with their markings and filed for possible future use, in a space far less than required by rolled films, which have the further disadvantage of inability to file one picture independently of another, and of the necessity of winding and rewinding to find the required portion.

Having thus described the invention, and set forth the manner of its construction and application, what is claimed as new and sought to secure by Letters Patent, is:

1. A flat film holder for use in X-ray apparatus, comprising a back plate, a thin frame, a relatively thick open topped spacer frame, an outer closed frame of lesser internal area than said open topped frame, sockets in the lower corners of said thin frame to receive the corners of a film, all of said elements being firmly united, a shutter slidable intermediate said outer frame and entered film, and a stop on said shutter limiting its maximum movement.

2. A flat film holder for use in X-ray apparatus, comprising a back plate, a thin frame, a relatively thick open topped spacer frame, an outer closed frame of lesser internal area than said open topped frame, all of said frames permanently connected to constitute a unit, a shutter slidable within the confines of said spacer frame, and a down-turned margin on said shutter to engage over the adjacent edge of said back plate when the shutter is fully closed.

3. A flat film holder for use in X-ray apparatus, comprising a thin frame having an opaque back, internal grooves in its sides and bottom and a recess in its uppermost element, an opaque shutter slidable in said grooves adjacent an entered film, an elongated stop to limit movement of said shutter, said stop when raised engaging in the mentioned recess, means to confine the lower corners of an entered film within said frame, and means carried by said shutter to overlappingly engage the upper edge of said frame back.

4. A flat film holder for use in X-ray apparatus comprising a thin frame having an opaque back, internal grooves in its side and bottom and a recess in its uppermost member, an opaque shutter slidable in said grooves, means on said shutter co-operative with said back to prevent entrance of light when the shutter is fully entered, a stop carried by said shutter fitting said recess when the shutter is raised preventing its complete withdrawal, and means to block a marginal portion of an entered film from the action of the X-rays.

5. A film holder housing having a groove and adapted for use in an X-ray apparatus comprising a casing open at one end, a cover hinged to partially close the opening, means to prevent the passage of light through the opening when said cover is closed, a film holder, a backing plate spring impelled against an entered film holder, and a spring pressed roll in said casing adapted to guide the film holder cover into its groove in said housing.

6. A film holder housing for an X-ray apparatus comprising a casing open at one end, a cover hinged to partially close the opening, flexible buffers on said cover to prevent the passage of light through the opening when said cover is closed, a film holder, a backing plate spring impelled against an entered film holder, means to retract said plate, and fixed means to guide a film holder entering therein.

7. A film holder housing for X-ray apparatus comprising a casing having a hinged closure at one end and a double means combined therewith to prevent the entrance of light when closed, a film holder, means for guiding a holder entering therewithin, means in the lower portion of said casing to automatically press the lower portion of an entered holder against the front wall of said casing, and yieldable means to force the entire body of said holder against said wall.

8. A film holder housing for X-ray apparatus comprising a casing receptive of said holder, a spring impelled plate to position the holder against the front wall of said casing, means to retract said plate, an intensifying screen carried by said plate adjacent said holder, and opaque material on an edge of the film holder, thus leaving an unexposed area on which identification data can be printed.

9. A film holder housing for X-ray apparatus comprising a casing receptive of said holder, a spring impelled plate to position the holder against the front wall of said casing, means to retract said plate, an intensifying screen of substantially equal area to a film in said holder juxtaposed thereagainst, said screen carried by said plate, said housing rotatable into horizontal and perpendicular positions, and means for clamping the housing when in adjustment.

JOSEPH ENGEL.